(12) United States Patent
Tanioka

(10) Patent No.: US 7,031,944 B2
(45) Date of Patent: Apr. 18, 2006

(54) DISTRIBUTED PROCESSING SYSTEM, METHOD OF THE SAME

(75) Inventor: Takahiro Tanioka, Tokyo (JP)

(73) Assignee: NEC Corporation, Tokyo (JP)

(*) Notice: Subject to any disclaimer, the term of this patent is extended or adjusted under 35 U.S.C. 154(b) by 341 days.

(21) Appl. No.: 09/854,556

(22) Filed: May 15, 2001

(65) Prior Publication Data

US 2001/0049663 A1  Dec. 6, 2001

(30) Foreign Application Priority Data

Jun. 2, 2000 (JP) .............................. 2000-166539

(51) Int. Cl.
*G06F 17/00* (2006.01)

(52) U.S. Cl. ..................... 705/59; 705/50; 705/53; 709/115; 709/223; 709/251

(58) Field of Classification Search .................. 705/59, 705/53; 709/115, 223, 251

See application file for complete search history.

(56) References Cited

U.S. PATENT DOCUMENTS

| | | | | |
|---|---|---|---|---|
| 6,112,243 | A * | 8/2000 | Downs et al. | 709/224 |
| 6,385,636 | B1 * | 5/2002 | Suzuki | 718/105 |
| 6,604,135 | B1 * | 8/2003 | Rogers et al. | 709/217 |
| 2002/0002538 | A1 * | 1/2002 | Ling | 705/41 |
| 2002/0019844 | A1 * | 2/2002 | Kurowski et al. | 709/201 |
| 2003/0149765 | A1 * | 8/2003 | Hubbard et al. | 709/224 |
| 2004/0249763 | A1 * | 12/2004 | Vardi | 705/59 |

FOREIGN PATENT DOCUMENTS

| | | |
|---|---|---|
| JP | 8-235112 | 9/1996 |
| JP | 11-149502 | 6/1999 |
| WO | WO 99/44121 A * | 9/1999 |

OTHER PUBLICATIONS

Japanese Office Action dated Jul. 27, 2004, with partial English translation.
Tamaki, Ryo-taro, Nikkei Computer, Nikkei BP Co., Ltd., May 22, 2000, No. 496, p. 22.
Nakagawa, M., Edition, "Amateur Group; Successive Decoding", Monthly Computer Digest, vol. 24, No. 6, Jun. 10, 1998, pp. 104-105.

* cited by examiner

Primary Examiner—Firmin Backer
(74) Attorney, Agent, or Firm—McGinn IP Law Group, PLLC

(57) ABSTRACT

A collection/distribution server divides processing task accepted from a customer terminal into a plurality of processing units, and transmits the units to at least one or more user terminals. The collection/distribution server receives processing results of execution on the user terminals, and integrates the processing results to send back to the customer terminal.

The user terminal registers with an application server in advance for receiving a task commission from the collection/distribution server, and receives a license application from the application server. When the license application receives a processing unit from the collection/distribution server, the license application executes the processing on the user terminal. The license application sends back a result of the processing to the collection/distribution server via a network. The user terminal receives a specified service as good value for executing the processing task substituting for a contractor.

13 Claims, 8 Drawing Sheets

DISTRIBUTED PROCESSING SYSTEM, METHOD OF THE SAME

BACKGROUND OF THE INVENTION

1. Field of the Invention

The present invention relates to a distributed processing technology. More particularly, the present invention relates to a distributed processing system and a method thereof in which processing of computing task is distributed into a plurality of terminals and executed.

2. Description of the Related Art

An operation style represented by an outsourcing operation has generally spread and widely recognized, where a company having computer equipment performs an operation of computing processing task for a customer on commission from other companies.

On the other hand, a sales method is generally performed, where a customer obtains software via a network such as the Internet to use it by paying a license fee or buys a product on an on-line shopping.

In order to execute the computing processing task, a contractor of the task has needed to prepare a large computer for performing a large-scale processing or a system for executing processing by distributing it into small computers such as personal computers at the contractor's expense.

However, there has been a problem that the large computer took an expensive initial installment cost, and that maintenance and management cost for operating the number of inexpensive personal computers or the like as equipment become expensive.

In recent years, calculation processing capabilities of a user terminal such as a personal computer has been rapidly improved owing to high operation frequency and the like of a microprocessor. As a result, the user terminal has come to own sufficient capabilities to execute applications regularly used by a user. However, with the high-speed processing capabilities of the user terminal, situation has occurred that all of the calculation processing capabilities is not fully used for executing the applications.

The present invention has been created based on the recognition of the foregoing subject. The main object of the invention is to provide a distributed processing system and a method thereof that are capable of controlling a cost for capital investment of the contractor of the computing task.

Another object of the present invention is to provide a distributed processing system and a method thereof, where the use of an application at the user terminal is possible without paying the license fee of the application by allowing the user terminal owned by the user to bear a part of a distributed execution of the computing task. Purposes, characteristics, advantages and the like of the present invention other than the foregoing objects will be immediately conceived by those who are skilled in the art from the embodiments described below.

SUMMARY OF THE INVENTION

In the present invention for achieving the foregoing objects, a collection/delivery sever divides and sends the processing task requested from a customer terminal so as to be executed in external user terminals connected via a network. The user terminal executes a divided processing task received from the server, and sends back a processing result via the network. Payment of good value for the processing task is made for the user terminal that executes the processing task by granting a license that enables the use of a specified software or by discounting a fee associated with enjoyment of a service by the user terminal.

It is will be immediately conceived from description below that the above-described objects are similarly achieved by the invention according to each claim of the scope of claims.

BRIEF DESCRIPTION OF THE DRAWINGS

These and other objects, features and advantages of the invention will become more fully apparent from the following detailed description taken in conjunction with accompanying drawings.

DESCRIPTION OF THE PREFERRED EMBODIMENTS

Figure 1:
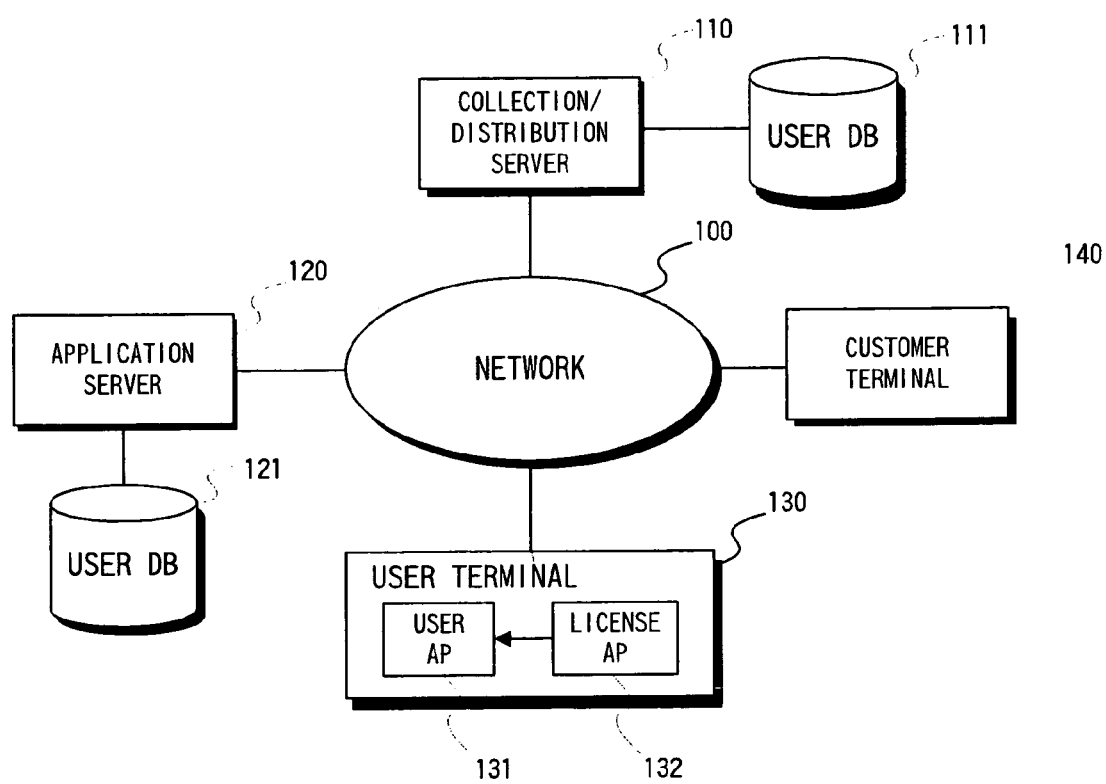
FIG. 1 is a view for showing a constitution of a first embodiment of the present invention.

Embodiments of the present invention will be described with reference to the drawings. In the distributed processing system of the present invention, under a control of a license application installed in a user terminal, the user terminal accepts a task transmitted from a server of a contractor of a computing task via a network. The user terminal performs arithmetic processing of the task, and transmits a processing result to the server via the network. As good value for executing the task processing, a license for using a software application at the user terminal or benefit such as discount on an on-line service is granted to the user terminal.

A user who uses the software application (AP) accesses an application server 120, which is equipped by a software sales company, via a network 100 by a user terminal 130. The user terminal 130 registers user information and obtains a user application 131 and a license application 132 from the application server 120.

The application server 120 transmits the user information of the user who is provided with the license application 132 to a collection/distribution server 110. Moreover, the software sales company running the application server 120 charges a license fee to the contractor in accordance with the number of applications (AP) provided to the user.

The contractor accepts a request of a computing processing task from customers by the collection/distribution server 110 on the network 100. The collection/distribution server 110 divides or manipulates the processing task such that the divided processing tasks can be distributed and executed by a plurality of user terminals. The collection/distribution server 110 issues a request of processing the divided tasks to each user terminal 130.

On receiving the computing processing task requested by the collection/distribution server 110, the license application 132 operating on the user terminal executes the processing on the user terminal 130. After the processing task is executed, the license application 132 sends back the processing result to the collection/distribution server 110. In addition, the license application 132 grants a license key to the user application 131.

The user application 131 to which the license key is granted from the license application 132 can be used on the user terminal 130. As described above, the user can use the user application 131 in exchange that the user contracts for the processing from the collection/distribution server 110 by the license application 132.

On the other hand, the collection/distribution server 110 transmits the computing processing results collected from each user terminal 130 to a customer terminal 140 and charges the fee to the customer in consideration of the computing processing.

Next, the embodiment of the present invention will be described with reference to the drawings.

Referring to FIG. 1, a first embodiment of the present invention includes the collection/distribution server 110 managed by the contractor of the computing processing task, the application server 120, the user terminal 130, the customer terminal 140, and the communication network 100 such as the Internet mutually connecting these servers and terminals.

Moreover, a user database 111 (abbreviated as "user DB") and a user DB 121 are connected to the collection/distribution server 110 and the application server 120 respectively. The user application 131 (abbreviated as "user AP") and the license application 132 (abbreviated as "license AP") run in the user terminal 130.

The customer terminal 140 is a terminal used by the customer who requests the computing processing task to the contractor. The customer terminal 140 transmits a task request to the collection/distribution server 110 managed by the contractor and receives the processing result from the collection/distribution server 110.

In the embodiment, the computing processing task is assumed to be a processing where parallelism of processing contents is relatively easily improved and a real time response is not much required. Specific examples of such a computing processing task are: science technology computing such as climate forecast; automatic translation of documents; and the like.

The collection/distribution server 110 is server managed by the contractor of the computing processing task. The collection/distribution server 110 receives the computing processing task request from the customer terminal 140. In addition, the collection/distribution server 110 divides the received computing processing task into a plurality of small processing units and distributes the divided processing unit to each user terminal 130. Moreover, the collection/distribution server 110 receives the processing results of each user terminal 130 from each user terminal 130. When all the processing results sent from the user terminals 130 are completely received, the collection/distribution server 110 integrates and edits the results to prepare the processing result for the computing processing task request, then transmits it to the customer terminal 140.

The collection/distribution server 110 is provided with the user DB 111 which stores user information of the user terminal 130 using the user AP 131. The user DB 111 is used for the purpose of identifying the user terminal 130 executing the processing unit.

The application server 120 is a server which supplies the user terminal 130 with the user AP 131 and the license AP 132. The application server 120 sends the user AP 131 and the license AP 132 to the user terminal 130 by the request from the user terminal 130. In addition, the application server 120 is provided with the user DB 121, which is used for managing the user information and the license fee of the user AP 131. The application server 120 sends the user information to the user DB 111 of the collection/distribution server 110.

The user terminal 130 is an information processing equipment such as a personal computer connected to the network 100. The user terminal 130 receives the user AP 131 and the license AP 132 from the application server 120 to run the applications.

In the embodiment, application software that can be generally used on the personal computer, for example, word processor software, e-mail client software and the like, is assumed as the user AP 131.

The license AP 132 is application software designed to always run on the user terminal 130. The license AP 132 provides the license key of the software to run the user AP 131 on the user terminal 130. The user can use the user AP 131 while the license AP 132 is running on the user terminal 130.

The license AP 132 receives the processing unit transmitted from the collection/distribution server 110. The license AP 132 executes the computing processing of the received processing unit on the user terminal 130, and sends back the computing processing result to the collection/distribution server 110.

Note that it is preferable to run the operation on the background of the user terminal 130 (in a multi-task processing operation system, the operation is processed not on the foreground but on the background), and also not to allow the user to sense the license AP 132 running.

Figure 2:
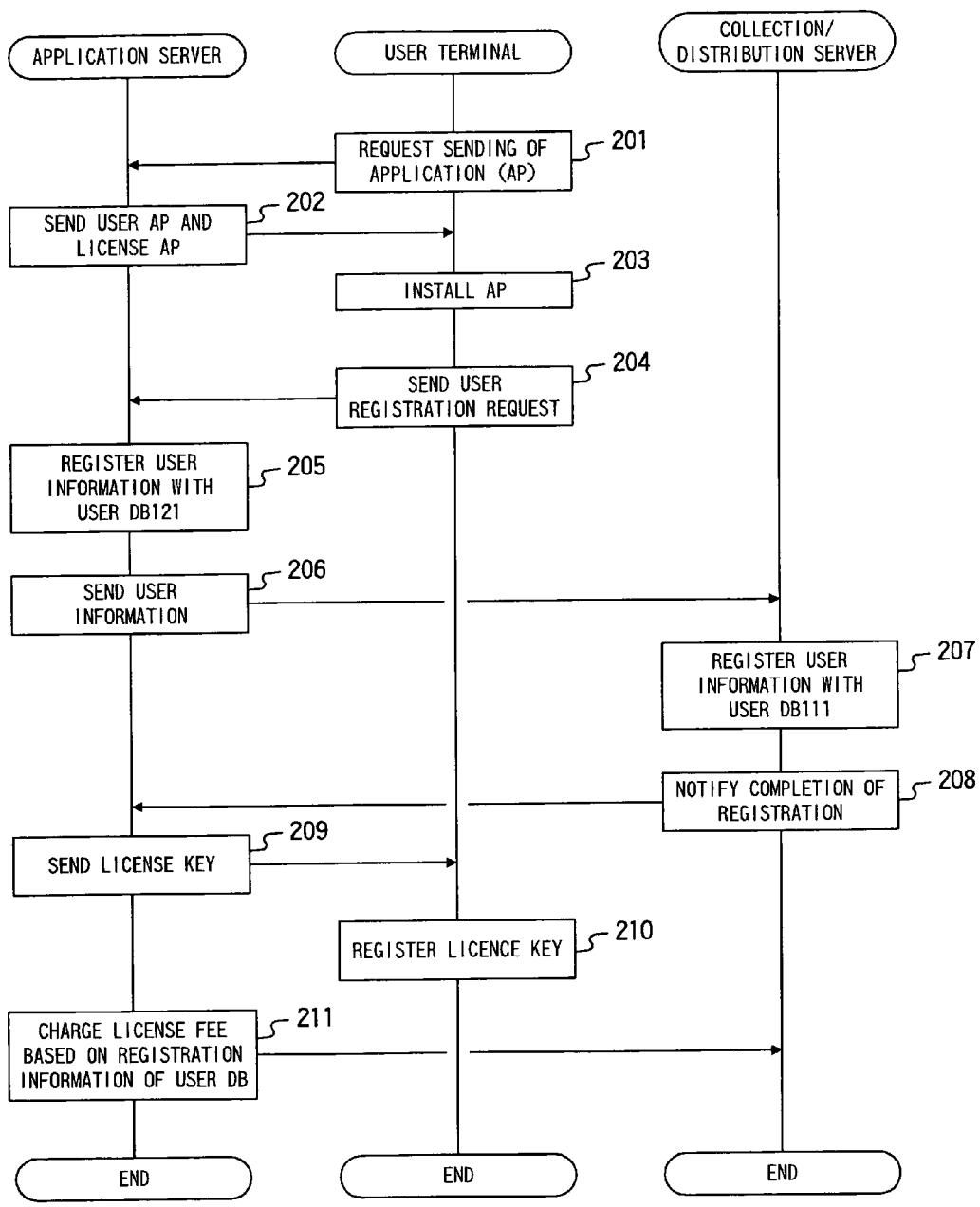
FIG. 2 is a flowchart for showing a processing procedure of the first embodiment.

Next, an operation example of the present invention will be described in detail. Referring to FIG. 1 and FIG. 2, those who want to use the user AP 131 access the application server 120 by the user terminal 130 via the network 100, and request for sending of the application (step 201).

The application server 120 sends the user AP 131 and the license AP 132 to the user terminal 130 in response to the request from the user terminal 130 (step 202).

After downloading the user AP 131 and the license AP 132 to the user terminal 130 (step 203), the user registers the user information with the user DB 121 of the application server 204 (step 204).

The user information sent at the time of registration includes information such as a user name, an address and the like for managing the users by the software sales company. However, the user information is not limited to the above-described information, but may be arbitrary as long as the user terminal 130 can be identified.

The application server 120 that accepted the user information registration request registers the user information with the user DB 121 (step 205), and then sends the user information to the collection/distribution server 110 (step 206).

The collection/distribution server 110 registers the user information sent from the application sever 120 with the user DB 111 (step 207), and then notifies the application server 120 that the registration is completed (step 208).

On receiving the notification, the application sever 120 sends the license key of the user AP 131 to the user terminal 130 (step 209), thus the license key is registered with the license AP 132 of the user terminal 130 (step 210).

With the registration of the license key, the license AP 132 can provide the user AP 131 with the license key, which enables the user to use the user AP 131 on the user terminal 130.

Further, thereafter, the software sales company charges the license fee to the contractor of the computing processing task based on the user information registered with the user DB 121 on the application server 120 (step 211). Note that the step 211 is not necessarily performed via the network 100, but may be performed by other means.

Figure 3:
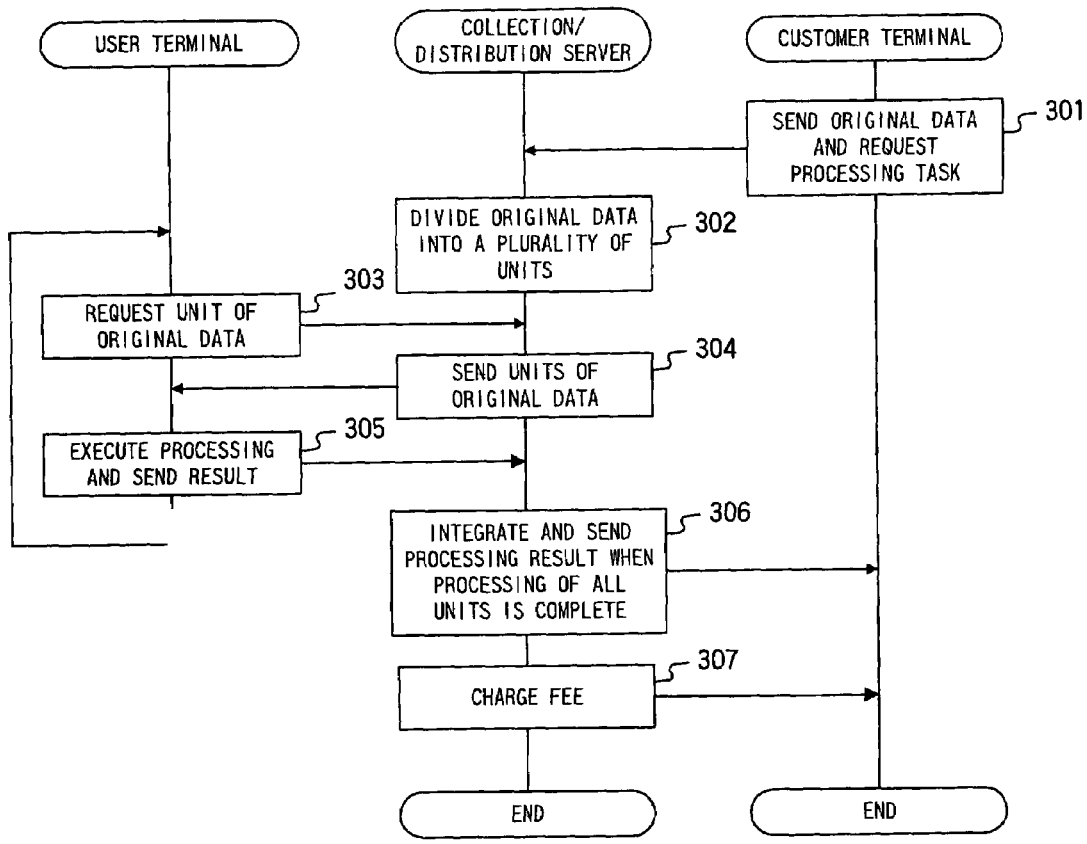
FIG. 3 is another flowchart for showing a processing procedure.

Referring to FIG. 3, the customer requests the computing processing to the collection/distribution server 110 by the customer terminal 140 along with sending original data to be processed to the collection/distribution server 110 (step 301).

The collection/distribution server 110 divides the original data into small processing units (units) such that a plurality of user terminals can perform the distributed processing, and the units are stored in the collection/distribution server 110 (step 302).

In an arbitrary user terminal 130, the license AP 132 running on the user terminal requests the collection/distribution server 110 of sending a new processing unit (unit) when the terminal does not have a processing unit to be executed (step 303).

The collection/distribution server 110 sends the processing unit to the user terminal 130 in response to the request from the license AP 132 (step 304). At the time when the request for sending a unit is accepted, it is preferable that the collection/distribution server 110 refers to the user DB 111 and confirms that the request is from the user terminal 130 regularly registered. This confirmation is done to prevent unauthorized access such as a prank.

The license AP 132 that received the processing unit executes the instructed computing processing on the user terminal 130, and sends the processing result to the collection/distribution server 110 (step 305).

After finishing the transmission of the result, the license AP 132 requests the next processing unit to the collection/distribution server 110 and repeatedly executes these steps (303, 304 and 305).

Since the user terminals 130 means a number of information processing equipments connected to the network 100, these steps are distributed and executed by a plurality of user terminals.

When the processing results of all the processing units are sent from the user terminals 130, the collection/distribution server 110 integrates and edits the processing results to prepare the processing result for the request from the original customer, and sends the processing result to the customer terminal 140 (step 306). The collection/distribution server 110 charges the fee of the computing processing task contracted to the customer terminal 140 (step 307). The last step 307 (charge of the computing processing fee to the customer) may be performed via the network or may be performed by other method.

Note that, depending on the contents of the contracted computing processing task, a case is assumed that a new processing unit, which is generated based on the processing result transmitted from the user terminal, is required to be processed by the user terminal once more. Such a case can be dealt with by executing the steps 302 to 305 repeatedly.

In addition, after the license key is registered with the license AP 132 of the user terminal 130, timing when the license AP 132 enables the use of user AP 131 may be set as the timing when the processing result is sent to the collection/distribution server 110. Alternatively, the license key may be sent either from the collection/distribution server 110 or the application server 120 to the user terminal 130, which shows a result that the license AP 132 has sent the processing result to the collection/distribution server 110.

Moreover, due to the characteristic of the network 100 and a run state of the user terminal 130, it is well assumed that the processing result is not sent back within a certain period of time after the processing unit is sent. In such cases, a redundant configure can be adopted such that the same processing unit is transmitted to a plurality of user terminals. Alternatively, in the case where the processing result cannot be obtained from the user terminal within a certain period of time, a widely known measure, for example, the processing unit is reassigned to other user terminal, and the like maybe performed if necessary.

Figure 4:
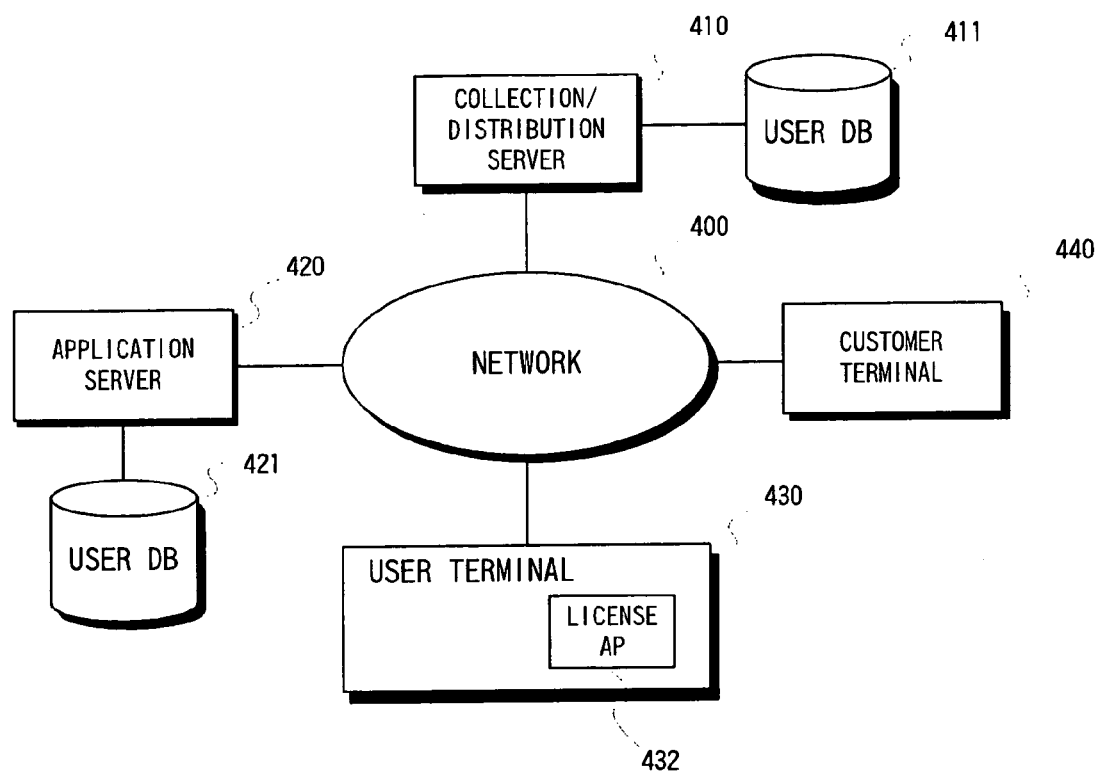
FIG. 4 is a view for showing a constitution of a second embodiment of the present invention.

Function of each processing step in the application server, the collection/distribution server and the like, which was described with reference to FIGS. 2 to 4, is realized by programs executed by computers which constitutes each server. The license application also consists of programs, and its function is realized by executing the programs on the user terminal. In this case, the program is read out from a recording medium (an FD (floppy disk), a CD-ROM, an HDD (hard disk drive), a semiconductor memory, an MT (magnetic tape) and the like) in which the program is recorded. The program is executed on the computer such as the server, thus processing and function of the application server, the collection/distribution server and the user terminal of the present invention can be realized.

A second embodiment of the present invention will be described. Referring to FIG. 4, the second embodiment of the present invention is constituted by comprising the collection/distribution server 410, the application server 420, the user terminal 430, the customer terminal 440, and the communication network 400 such as the Internet mutually connecting the foregoing. The user registers the user information with an application server 420, which is managed by the contractor providing a service, by a user terminal 430, and obtains a license AP 432 from the application server 420 via a network 400. The application server 420 sends the license key (identifier) to the user terminal 430 after transmitting the user information to a collection/distribution server 410 and registering the user information with the collection/distribution server 410.

The customer of the contractor requests the computing processing task to the collection/distribution server 410 of the contractor from a customer terminal 440 via the network 400. When the collection/distribution server 410 accepts the request and data from the customer terminal 440, the collection/distribution server 410 divides or manipulates the computing processing task into a form that a plurality of the user terminals 430 registered with the collection/distribution server 410 can severally perform the processing. Then, the collection/distribution server 410 asks the computing processing to each user terminal.

In each user terminal 430, when the license AP 432 receives the computing processing requested by the collection/distribution server 410, the license AP 432 executes the computing processing on the user terminal 430. After the license AP 432 executed the computing processing, the license AP 432 sends back the processing result to the collection/distribution server 410.

The collection/distribution server 410 integrates and transmits the computing processing results collected from the user terminals to the customer terminal 440, and charges the fee to the customer.

The collection/distribution server 410 sends the amount of the computing processing, whose execution ended, of every user terminal 430 to the application server 420 as a form of points. The application server 420 adds a point value sent from the collection/distribution server 410 to a point value of a specified user by inquiring a user DB 421.

When provision of a service is requested from the user terminal 430 that executed the computing processing, the application server 420 checks whether or not the user who requested the service is the user registered with the user DB 421 based on the license key sent by the user terminal 430. In the case where the user terminal is determined to be the registered user, the application server 420 provides the user terminal with various services.

The services may be shopping of articles on an on-line shopping, a provider connection and the like other than the foregoing use of the user AP.

The application server 420 discounts the user fee of the application and the fee in the on-line shopping in exchange for the point value of every user stored in the user DB 421. The fee equivalent to the discounted amount is charged to the contractor.

The second embodiment of the present invention is different from the first embodiment on the following point. The second embodiment has a construction that the user terminal 430 connects to the application server 420 on the network 400 and receives the service. As the service, a paid on-line service such as database search service and a mail-order service such as an on-line shopping mall are applicable. In the following, an example applied to the mail-order service will be described.

Referring to FIG. 4, the collection/distribution server 410, a user DB 411, the user terminal 430, the customer terminal 440 and the network 400 are equivalent to the collection/distribution server 110, the user DB 111, the user terminal 130, the customer terminal 140 and the network 100 respectively.

The user DB 411 provided with the collection/distribution server 410 holds the amount of the computing processing, whose execution ended, of every user terminal as "point" in addition to the contents of the user DB 111 of the first embodiment.

The application server 420 is equipped by the company providing the service. The application server 420 provides the user terminal 430 that accessed the server 420 via the network with various services.

Moreover, the application server 420 is provided with the user DB 421 for storing the registered user information, and calculates the fee of using the service based on the information stored in the user DB 421 and the like.

Although the license AP 432 runs on the user terminal 430, unlike the first embodiment, the license AP 432 itself does not have a function for supplying the license key that enables the use of the user AP.

Figure 5:
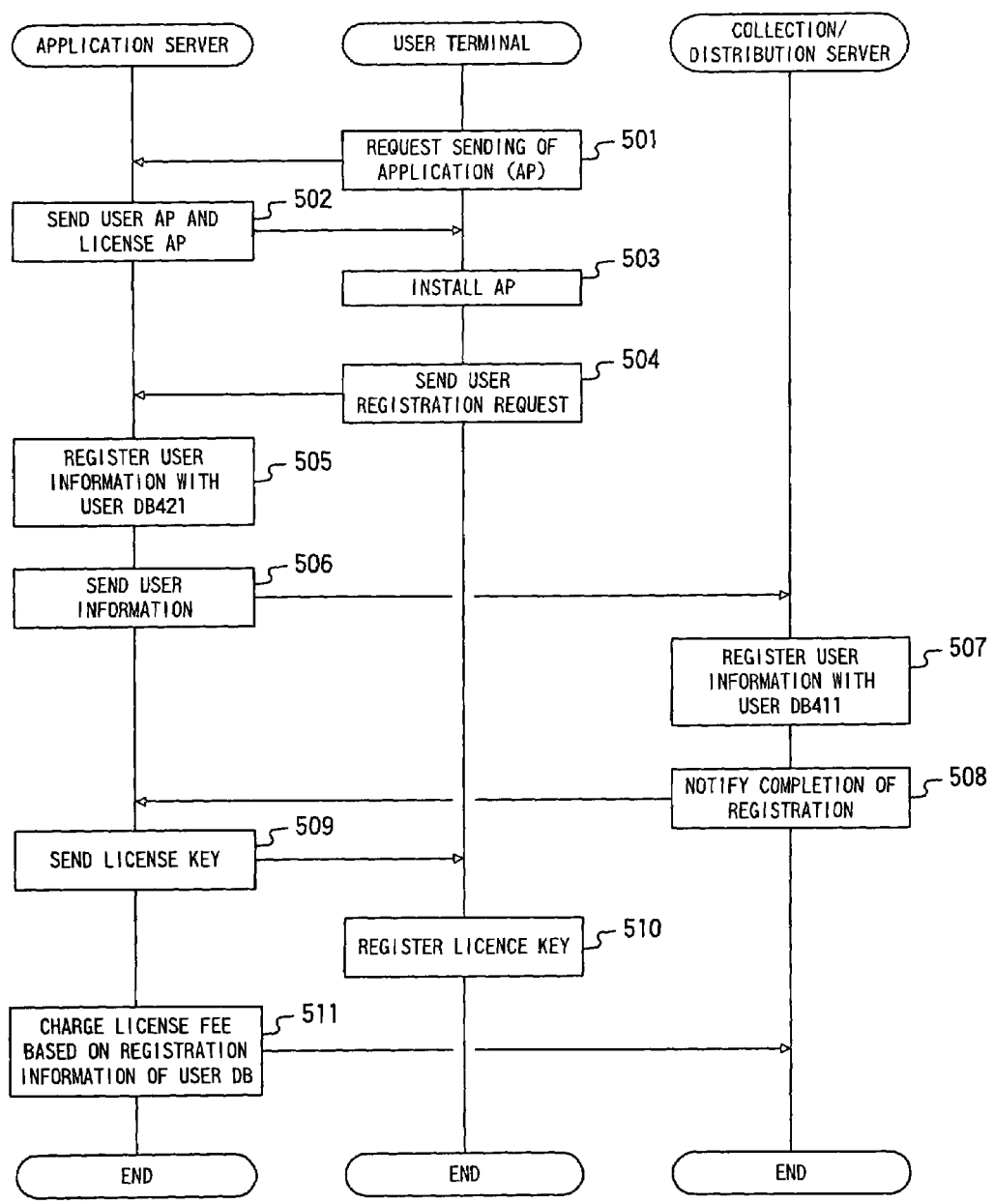
FIG. 5 is a flowchart for showing a processing procedure of the second embodiment.

Next, a processing procedure of the second embodiment will be described. Referring to FIG. 5, the user who wants to use the service accesses the application server 420 from the user terminal 430, and requests sending of the license AP 432 (step 501).

On receiving the request, the application server 420 sends the license AP to the user terminal 430 (step 502), and the user installs the license AP 432 on his/her user terminal (step 503).

Subsequently, the user performs the user registration with the application server 420 from the user terminal 430 (step 504). At this time, similarly to the first embodiment, the user information to be sent maybe arbitrary as long as the user terminal can be identified.

The application server 420, with which the user registration is made, registers the user information with the user DB 421 (step 505). Moreover, the application server 420 sends the user information to the collection/distribution server 410 (step 506). On receiving the user information, the collection/distribution server 410 registers it with the user DB 411 (step 507), and sends the registration completion notification to the application server 420 (step 508).

On receiving the registration completion notification from the collection/distribution server 410, the application server 420 sends the license key to the user terminal 430 (step 509). The user terminal 430, by receiving the license key from the application server 430, completes the registration operation (step 510). The software sales company charges the license fee to the contractor of the computing processing task based on the user information registered with the user DB 421 on the application server 420 (step 511). Note that the step 511 is not necessarily performed via the network 400.

Figure 6:
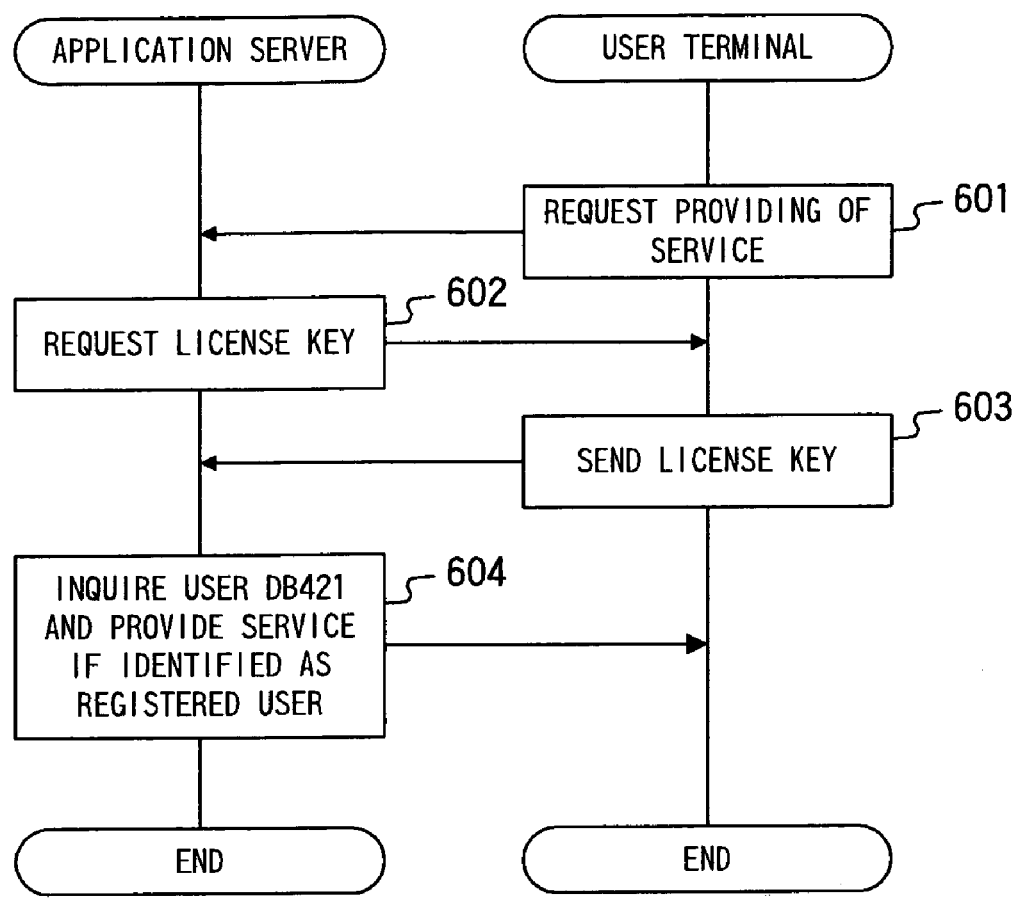
FIG. 6 is another flowchart for showing a processing procedure.

Operation will be described in the case where the user receives the service. Referring to FIG. 6, the user connects with the application server 420 from the user terminal 430 via the network 400 (step 601). The application server 420 requests the license key to the user terminal 430 (step 602). This license key is the one presented to the user on the previous step 509, which is used for user verification when receiving the service.

The user terminal 430 sends the license key to the application server 420 (step 603). Receiving the license key, the application server 420 inquires the user DB 421 for the user verification, and provides the user terminal 430 with various services if the verification succeeds. In the case of the mail-order service, the verification operation may be performed at the time when the service starts or after an article to be bought is decided. These steps are similar to the operation of the widely known on-line mail-order.

Figure 7:
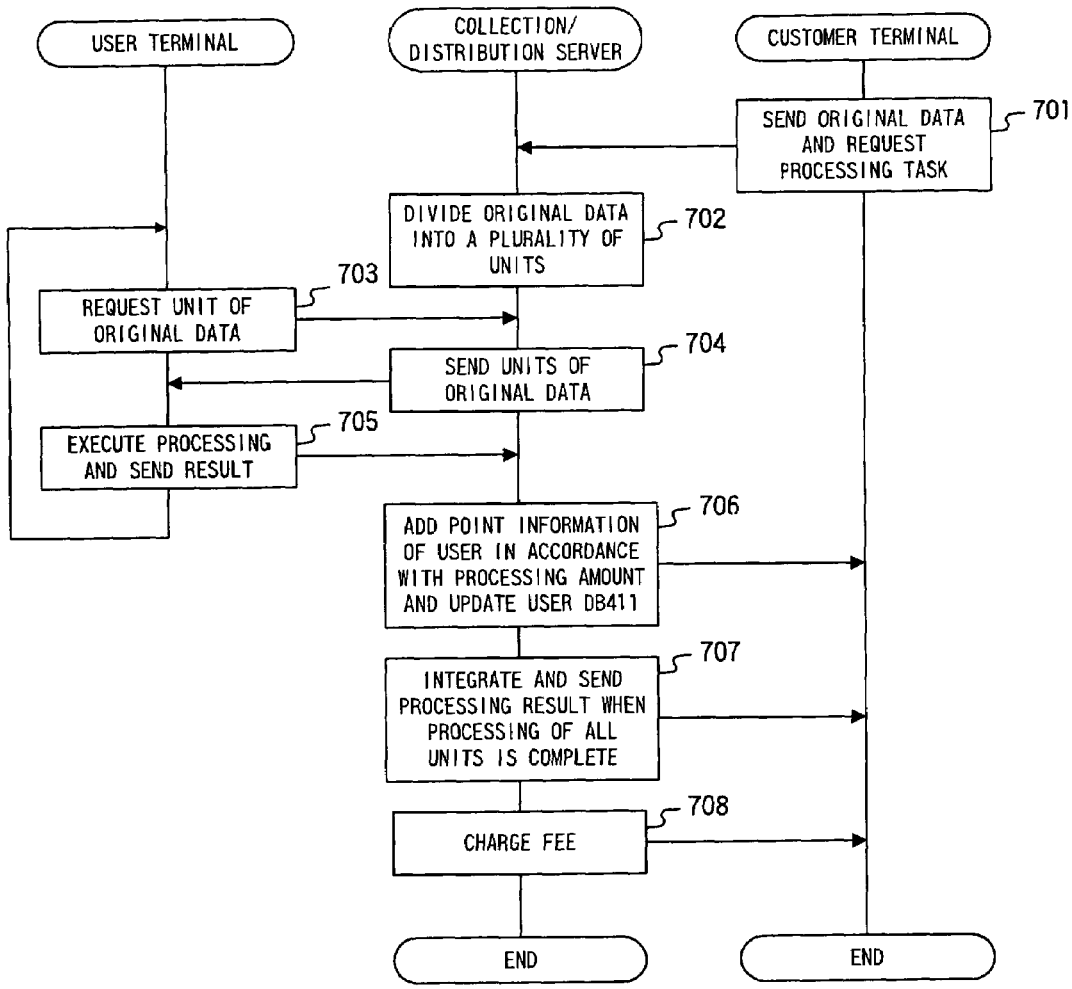
FIG. 7 is another flowchart for showing a processing procedure.

Description will be made for the case where the contractor of the computing task receives the request from the customer. Referring to FIG. 7, similarly to the first embodiment, when the request of the task from the customer is received, the collection/distribution server 410 divides the computing processing task into a plurality of processing units and distributes them to a plurality of user terminals which require the processing unit. The user terminals severally perform the processing unit (steps 701 to 705).

Receiving the processing result sent from the user terminal 430, the collection/distribution server 410 gives the point value to the user terminal 430 in accordance with the processing amount of the processing unit to which the computing processing is performed, and updates the information of the user DB 411 (step 706).

Thereafter, similarly to the first embodiment shown in FIG. 3, all the processing results are integrated and sent to the customer terminals, and charges the fee to the customer terminal later (steps 707 and 708).

Figure 8:
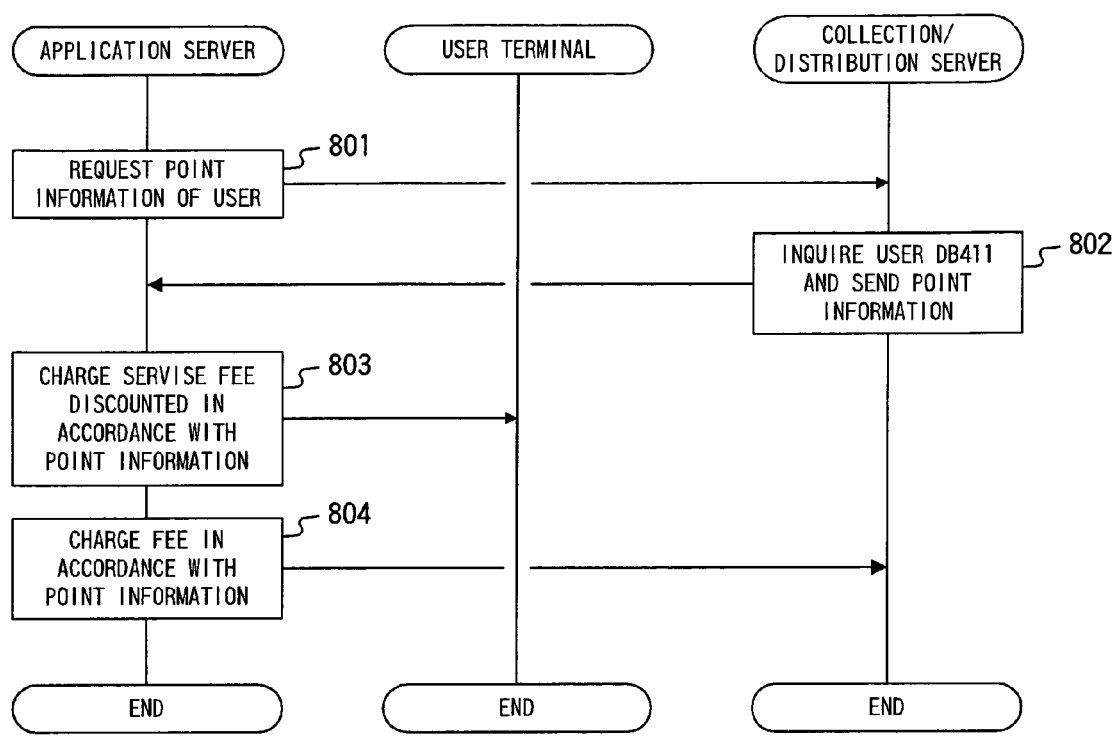
FIG. 8 is still another flowchart for showing a processing procedure.

Referring to FIG. 8, the application server 420 inquires the point value of the user terminal 430 from the collection/distribution server 410 (step 801). The collection/distribution server 410 obtains the point value of the specified user terminal by inquiring of the user DB 411, and sends the point value to the application server 420 (step 802). The application server 420 charges the amount in which the amount corresponding to the point value is discounted from the user fee of the service used by the user terminal (step 803). In addition, the application server 420 charges the fee equivalent to the discounted amount to the contractor (the collection/distribution server 410). The accounting processing of the application server 420 may be performed periodically.

The fee charging in steps 803 and 804 may be performed via the network 400, or the fee charging may be performed by other means.

Function of each processing step in the application server, the collection/distribution server and the like is realized by the programs executed by computers which constitutes each server. The license application also consists of programs, and its function is realized by executing the program on the user terminal. In this case, the program is read out from a recording medium (an FD (floppy disk), a CD-ROM, an HDD (hard disk drive), a semiconductor memory, an MT (magnetic tape) and the like) in which the program is recorded. And the program is executed on the computer such as the server, thus processing and function of the application server, the collection/distribution server and the user terminal of the present invention can be realized.

As described above, according to the present invention, there exists an effect that the cost for capital investment necessary for processing the requested computing processing task in the contractor of the task can be controlled. The reason is that the contractor does not need to own an expensive computer equipment since the processing request is made for a plurality of the user terminals connected to the network.

There exists another effect that the user who wants to use the application on the user terminal does not need to pay the license fee for the application. The reason is that the user provides a resource (calculation processing capability) of the user terminal on receiving the computing processing request from the contractor. Moreover, it is possible not to allow the user to sense that the resource is being provided.

In addition, the software sales company can increase the number of users of the application. The reason is that the user can easily introduce the application since the user of the application does not need to pay the license fee or the user can receive a discount of the license fee.

The customer who commits the computing processing task to the contractor can control a commission cost. The reason is that the commission fee can be indirectly reduced since the cost for the capital investment of the contractor can be controlled.

Although the preferred embodiments of the present invention have been described in detail, it should be understood that various changes, substitutions and alternations can be made therein without departing from spirit and scope of the inventions as defined by the appended claims.

What is claimed is:

1. A distributed processing method in which a processing task is distributed to a plurality of user terminals in a network and executed by the plurality of user terminals, said distributed processing method comprising:
    a collection/distribution server dividing said processing task into one or more processing units and distributing the units to said user terminals so that:
        each user terminal of said plurality of user terminals receiving a processing unit transmitted from said collection/distribution server via the network can execute the processing unit under control of a license application installed in the user terminal; and
        each user terminal of said plurality of user terminals can then send back a processing result to said collection/distribution server via the network,
    wherein said license application provides each said user terminal with a license for using a user application as a value for executing said processing unit, said license indicating an agreement that said user application can be executed by said user terminal as a value for executing said processing unit, instead of paying a predetermined license fee.

2. The method of claim 1, wherein said license indicates an agreement that said user application can be executed by said user terminal at another license fee, which is less than said predetermined license fee by a predetermined amount based on having executed said processing unit.

3. A distributed processing method for a processing task, comprising:
    a user terminal obtaining a user application and a license application from an application server via a network;
    said application server transmitting information of a user who obtained said user application and said license application to a collection/distribution server;
    said collection/distribution server accepting a request for a processing task from a customer terminal via the network;
    said collection/distribution server dividing said processing task into a form which can be distributed and executed in a plurality of user terminals;
    said collection/distribution server requesting said user terminal of executing the divided processing task based on the user information received from said application server;
    said license application executing the divided processing task requested from said collection/distribution server by said license application on said user terminal, and sending back a processing result to said collection/distribution server from said user terminal;
    said license application providing the user terminal with a license key for said user application installed to said user terminal, said license indicating an agreement that said user application can be executed by said user terminal as a value for executing said processing unit, instead of paying a predetermined license fee; and
    said collection/distribution server integrating the processing results of the processing task collected from said user terminals to transmit an integrated result to said customer terminal.

4. The distributed processing method according to claim 3, wherein said license application runs as a background processing on said user terminal.

5. The method of claim 3, wherein said license indicates an agreement that said user application can be executed by said user terminal at another license fee, which is less than said predetermined license fee by a predetermined amount based on having executed said processing unit.

6. The distributed processing method according to claim 4, further comprising:
    said application server accounting to said collection/distribution server in accordance with a number of the license applications supplied to said user terminal.

7. A distributed processing system in which a processing task is executed by a plurality of user terminals, comprising:
    a collection/distribution server which divides a processing task requested from a customer terminal into a plurality of processing units and distributes said processing units to said user terminals via the network; and
    an application server which supplies said user terminals with a user application and a license application in response to a request from said user terminals, wherein the license application supplied to said user terminal allows said processing unit to be executed on said user terminal and a processing result obtained therefrom to be sent back, when said user terminal receives one or more said processing units from said collection/distribution server, said license application also provides the user terminal with a license key for using said user application, said license indicating an agreement that said user application can be executed by said user terminal as a value for executing said processing unit, instead of paying a predetermined license fee.

8. The system of claim 7, wherein said license indicates an agreement that said user application can be executed by said user terminal at another license fee, which is less than said predetermined license fee by a predetermined amount based on having executed said processing unit.

9. The distributed processing system according to claim 7, further comprising:
a first user database which connects to said application server and which stores user information of said user terminals, to which said application server supplied the user application and the license application,
wherein said application server notifies said collection/distribution server of the user information when storing the user information into the first database.

10. The distributed processing system according to claim 9, further comprising:
a second user database which connects to said collection/distribution server and which stores the user information received by said collection/distribution server from said application server,
wherein said collection/distribution server manages the user terminals which execute a divided processing task based on contents in said second user database.

11. The distributed processing system according to claim 10, wherein the license application supplied to said user terminal requests the processing unit to said collection/distribution server when the license application runs on said user terminal.

12. A storage medium embodying a program of machine-readable instructions executable by a digital processing apparatus, said program causing a user terminal, being in a distributed processing system comprising:
a collection/distribution server;
an application server;
at least one or more user terminals; and
a network mutually connecting the foregoing,
to perform a method of distributed processing, said method comprising:
receiving a license key capable of using a specified user application from said application server;
executing at least one or more processing units received from said collection/distribution server on said user terminal;
sending back a result of executing said processing unit to said collection/distribution server; and
applying said license key to said user application an said user terminal as a value for executing said processing units, said license key defining a license indicating an agreement that said user application can be executed by said user terminal as a value for executing said processing unit, instead of paying a predetermined license fee.

13. The signal-bearing medium of claim 12, wherein said license indicates an agreement that said user application can be executed by said user terminal at another license fee, which is less than said predetermined license fee by a predetermined amount based on having executed said processing unit.

* * * * *